United States Patent [19]

Welch

[11] Patent Number: 5,609,913

[45] Date of Patent: Mar. 11, 1997

[54] PROCESS FOR MANUFACTURING DOG CHEW TOYS OF TIRE SIDEWALLS

[75] Inventor: James W. Welch, El Paso, Tex.

[73] Assignee: CB Worldwide Inc., Mammoth Lakes, Calif.

[21] Appl. No.: 631,370

[22] Filed: Apr. 12, 1996

[51] Int. Cl.⁶ .................... B05D 3/12; A01K 29/00
[52] U.S. Cl. .................. 427/242; 119/710; 426/480; 427/290; 427/322; 428/903.3
[58] Field of Search ................... 427/290, 242, 427/322, 299, 413; 119/710, 711; 426/480, 805; 428/903.3

[56] References Cited

U.S. PATENT DOCUMENTS

| | | | |
|---|---|---|---|
| 2,069,391 | 2/1937 | Sample | 428/903.3 |
| 2,194,736 | 3/1940 | de Bruler | 119/711 |
| 3,871,334 | 3/1975 | Axelrod | 426/805 |
| 4,036,271 | 7/1977 | Presti | 150/54 B |
| 4,145,955 | 3/1979 | Mueller et al. | 90/13.7 |
| 4,157,727 | 6/1979 | McDonough et al. | 157/13 |
| 4,469,817 | 9/1984 | Hayashi et al. | 521/45 |
| 4,557,219 | 12/1985 | Edwards | 119/710 |
| 4,579,871 | 4/1986 | Lindén et al. | 521/43 |
| 4,614,752 | 9/1986 | Fuchs et al. | 521/44.5 |
| 4,873,096 | 10/1989 | Spiel et al. | 426/805 |
| 5,057,333 | 10/1991 | Lawson | 426/480 |
| 5,120,767 | 6/1992 | Allard et al. | 521/40.5 |
| 5,149,550 | 9/1992 | Mohilef | 426/480 |
| 5,339,771 | 8/1994 | Axelrod | 119/711 |
| 5,356,939 | 10/1994 | Burrowes et al. | 524/41.5 |
| 5,369,830 | 12/1994 | Chiarabini Bravi | 12/146 BR |
| 5,397,818 | 3/1995 | Flanigan | 524/68 |
| 5,407,661 | 4/1995 | Simone et al. | 426/805 |

FOREIGN PATENT DOCUMENTS 2083217A 12/1971 France .................. 119/710

*Primary Examiner*—Diana Dudash
*Attorney, Agent, or Firm*—Kelly, Bauersfled & Lowry

[57] ABSTRACT

A die is utilized to cut chew toy bases from tire sidewalls extracted from used tires. The chew toy bases are placed into a cleaning tumbler containing sand and gravel for the purpose of cleaning and polishing the chew toy bases. They are subsequently removed from the cleaning tumbler and placed into a rinsing tumbler containing water to remove residual sand and dirt. The chew toy bases are placed onto a drying rack, and then removed into a final treatment tumbler containing porous media having flavoring and beautifying agents applied thereto. Rotation of the final treatment tumbler brings the chew toy bases into contact with the porous media to effect a transfer of the flavoring and beautifying agents to the chew toy bases. When removed from the final treatment tumbler, the cleaned and treated chew toy bases may be utilized as dog chew toys.

21 Claims, 3 Drawing Sheets

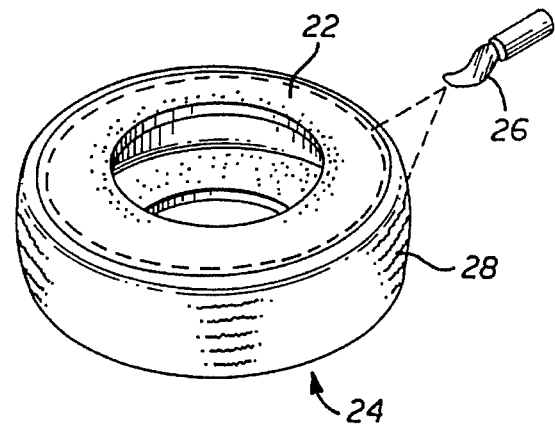
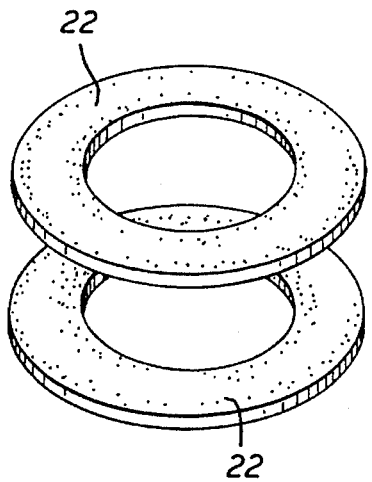
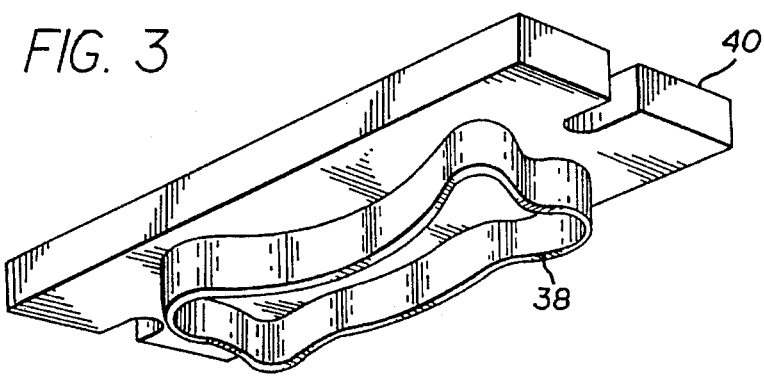
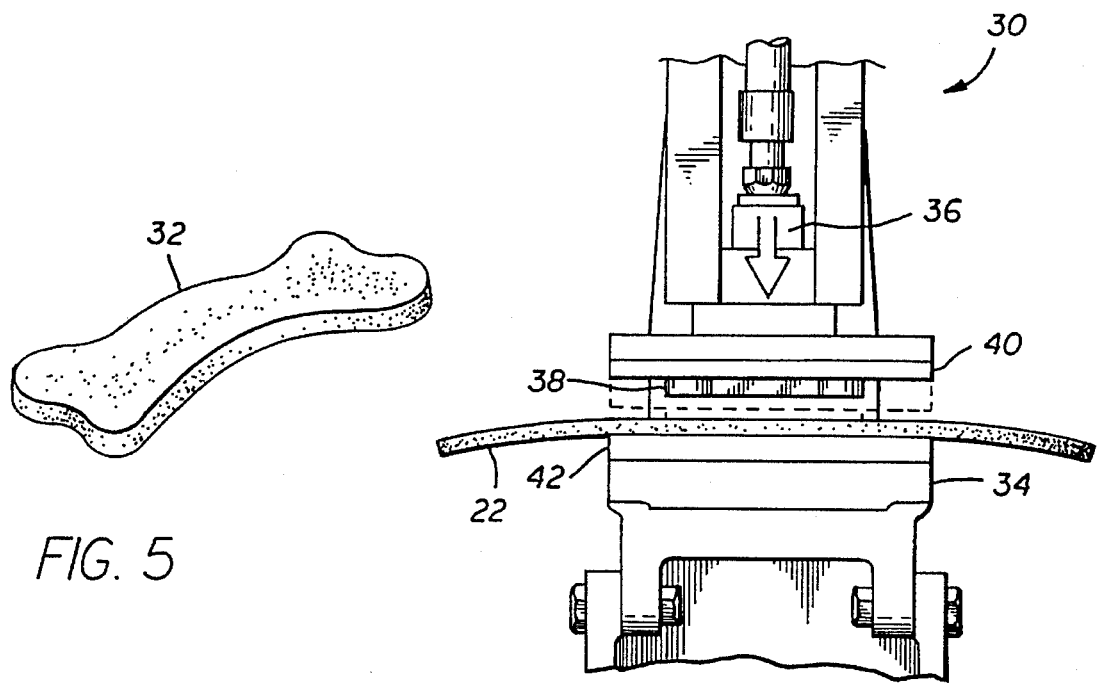

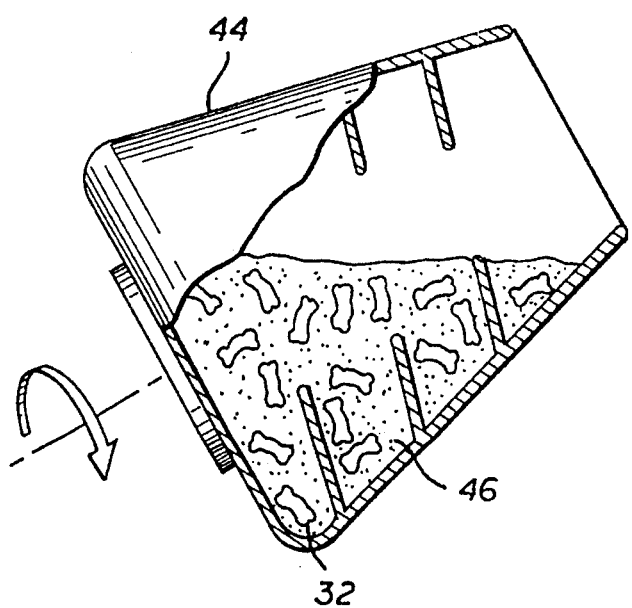
FIG. 6
FIG. 7
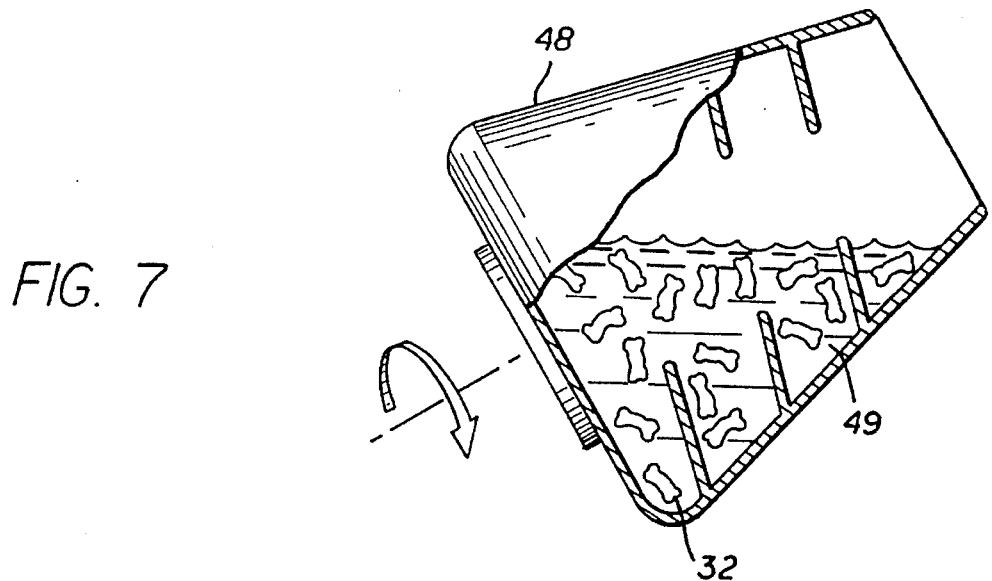
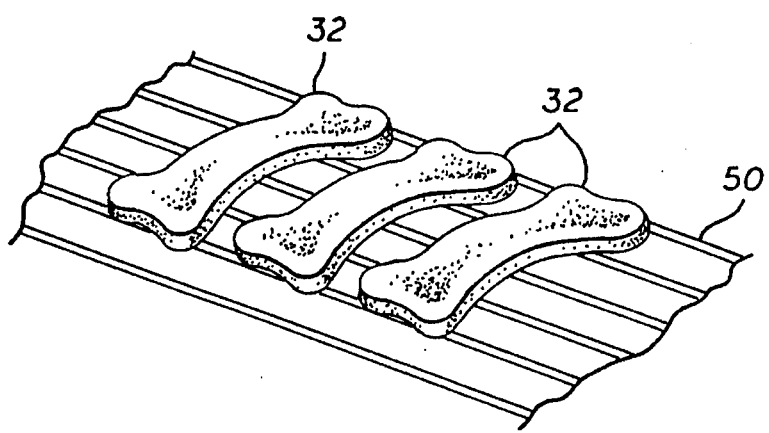
FIG. 8

PROCESS FOR MANUFACTURING DOG CHEW TOYS OF TIRE SIDEWALLS

BACKGROUND OF THE INVENTION

This invention relates generally to the manufacture of rubber articles. More specifically, the present invention relates to a process for manufacturing dog chew toys of the tire sidewalls of used tires.

The benefits of recycling rubber are well known. Much work has been done to devise methods of recycling rubber through reclaiming and the use of various chemical additives to revulcanize the recycled rubber. See, for example, U.S. Pat. No. 4,579,871 and the discussion of prior rubber reclaiming methods therein. Furthermore, there is produced each year vast quantities of ground cured rubber from operations such as the grinding of used tires and the grinding and buffing of various rubber articles such as transmission belts, conveyer belts and tire carcasses in recapping operations.

The disposal and/or reprocessing of used tires in an environmentally safe manner has proven to be a relatively expensive proposition. There has been a need, therefore, for improved methods for utilizing components of used tires in an environmentally safe manner, which the consumer finds beneficial. In this regard, advantageous use of used tire components to manufacture new articles should require a minimum of processing of the used tire components to create a product pleasing to the senses and functionally viable. A potential market for such products is in the pet care industry.

Accordingly, there has been a need for a novel process for manufacturing useful articles of tire components, which process may be utilized to efficiently manufacture such articles in great quantities at relatively low cost. As there is a need in the pet care industry for dog chew toys, there is a need to develop a process to utilize tire components to manufacture such toys. The present invention fulfills these needs and provides other related advantages.

SUMMARY OF THE INVENTION

The present invention resides in the process for manufacturing dog chew toys of tire sidewalls removed from used tires. The process comprises, generally, the steps of cutting a chew toy base from a tire sidewall, and cleaning and polishing the chew toy base within a cleaning tumbler utilizing sand and gravel. Once the chew toy base is removed from the cleaning tumbler, it is rinsed to remove residual sand therefrom, and then placed within a final treatment tumbler to flavor the chew toy base with a flavoring agent. Additionally, the chew toy base may be beautified with a conditioning agent simultaneously with the step of flavoring the chew toy base within the final treatment tumbler.

In a preferred form of the invention, the entire sidewall is cut from a used tire prior to the step of cutting the chew toy base from the tire sidewall. The step of cutting the sidewall from the tire includes the steps of utilizing a stationary knife to effect the cutting while rotating the tire.

Next, the chew toy base is cut from the sidewall into a desired configuration utilizing a die. The die is preferably fit to a press, and then the tire sidewall is placed adjacent to the die which is then activated to cut the chew toy base from the tire sidewall. The chew toy base is removed from the die, the tire sidewall is rotated to place an unused portion adjacent to the die, and then the press is activated to cut another chew toy base. This cutting process continues until substantially the entire sidewall is consumed in creating chew toy bases.

The chew toy bases are placed into a cleaning tumbler containing sand and gravel, and the cleaning tumbler is rotated to clean and polish the chew toy bases. They are then removed from the cleaning tumbler and placed into a rinsing tumbler containing water. The rinsing tumbler is rotated to remove residual sand and dirt from the chew toy bases. Afterwards, the chew toy bases are removed from the rinsing tumbler and placed onto drying racks.

Once dry, the chew toy bases are placed into a final treatment tumbler containing porous media having flavoring and beautifying/conditioning agents applied thereto. The flavoring agents may include salt, animal fat, smoke flavor, and other flavor variations. The preferred beautifying agent is Armor All. The chew toy bases and the porous media are rotated within the final treatment tumbler to bring the chew toy bases into contact with the porous media to effect a transfer of the flavoring agent and the beautifying agent to the chew toy bases.

The resulting product is a dog chew toy of a quality that may be sold on the retail market. The dog chew toys may be easily shipped in bulk packaging without degrading the quality thereof.

Other features and advantages of the present invention will become apparent from the following more detailed description, taken in conjunction with the accompanying drawings which illustrate, by way of example, the principles of the invention.

BRIEF DESCRIPTION OF THE DRAWINGS

The accompany drawings illustrate the invention. In such drawings:

FIG. 1 is a perspective view of a used tire and a hand-held knife, illustrating one method of cutting tire sidewalls from the used tire;

FIG. 2 is a perspective view of two tire sidewalls cut from the used tire shown in FIG. 1;

FIG. 3 is a perspective view of a cutting die on a backing plate utilized to cut chew toy bases from the tire sidewalls in accordance with the process of the present invention;

FIG. 4 is a front elevational view of a mechanical punch press having the cutting die and backing plate mounted to an upper moving portion of a press plate, and further illustrating the positioning of a tire sidewall over a lower stationary platform and adjacent to the cutting die;

FIG. 5 is a perspective view of a chew toy base cut from the tire sidewall utilizing the cutting die of FIG. 3;

FIG. 6 is an elevational and partially sectional view illustrating a plurality of chew toy bases within a cleaning tumbler filled with sand and gravel which is rotated for purposes of cleaning and polishing the chew toy bases;

FIG. 7 is an elevational and partially sectional view of a rinsing tumbler into which the chew toy bases removed from the cleaning tumbler of FIG. 6 are placed with water for purposes of removing residual sand and dirt therefrom;

FIG. 8 illustrates the step of removing the chew toy bases from the rinsing tumbler of FIG. 7 and placing them on a drying rack;

DETAILED DESCRIPTION OF THE PREFERRED EMBODIMENT

Figure 9:
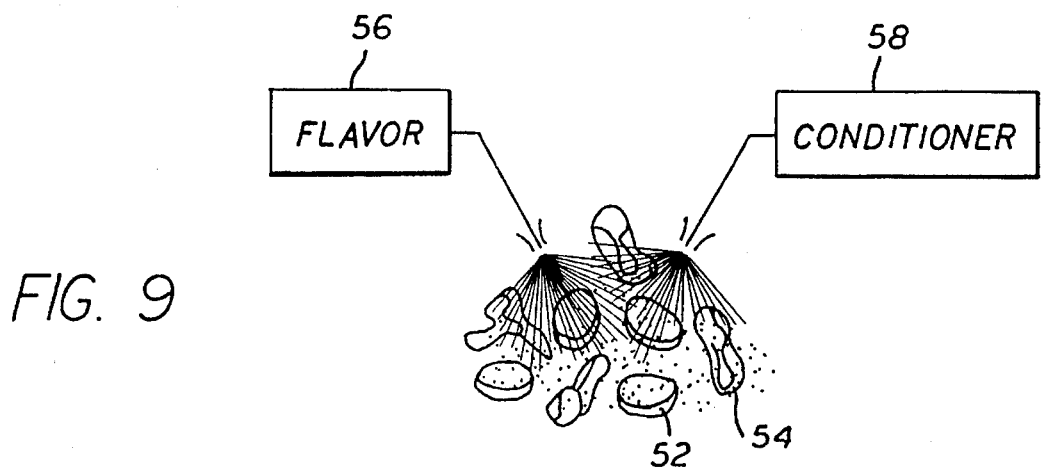
FIG. 9 illustrates the step of applying a flavoring agent and a conditioning agent (rubber beautifier) to porous media such as cloths and sponges.

As shown in the drawings for purposes of illustration, the present invention is concerned with a novel process for manufacturing dog chew toys (generally designated in FIG. 11 by the reference number 20) from the sidewalls 22 of used tires 24 (see FIGS. 1 and 2).

In accordance with the present invention and with reference initially to FIGS. 1 and 2, the process involves obtaining used tires 24 from tire scrap yards, tire shops and other locations where used tires are accumulated. A tire sidewall 22 is extracted from the used tire 24 by use of a hand held knife 26 or by means of a knife positioned on a rotating arm pivoting at a center point. The purpose is to separate the tire sidewall 22 from the tire tread 28. Two tire sidewalls 22 may be extracted from one tire 24 (FIG. 2).

With reference to FIGS. 3–5, the tire sidewall 22 is then placed in either a mechanical punch press 30 or a similar die cut press such as a hydraulic clicker press. In this regard, mechanical punch presses are ideal for die cutting chew toy bases 32 (FIG. 5) since they have a fast cycle, low maintenance, low cost for used presses, and are easily obtainable. Such presses 30 typically are manufactured to have a vertical stroke whereby the material to be cut is placed on a lower stationary platform 34. An upper moving portion 36 of the punch press 30 is fitted with a die 38 attached to a backing plate 40 (FIG. 3). The lower stationary platform 34 is fitted with a hard plastic punch base 42 which is designed to provide a solid cutting surface while not damaging the cutting die 38. The plastic punch base 42 is preferably fabricated with vacuum holes and a vacuum apparatus (not shown). The vacuum plate will remove the cut chew toy bases 32 out of the cutting die 38 so that the cut sidewall 22 can be easily removed from the punch press 30.

The cutting die 38 is preferably made of hardened steel rule material. The steel rule is bent to form a desired shape. Exemplary shapes include the bone shape illustrated, airplanes, throw balls, ball and chains, fire hydrants, letters, and numbers. The steel rule is available in both straight edge (as shown) and serrated edge. The serrated edge offers better cutting performance. The cutting die 38 is then mounted on the backing plate 40 which gives the cutting die rigidity for added cutting performance and die longevity.

With the tire sidewall 22 placed over the lower stationary platform 34 directly over the plastic punch base 42 as shown in FIG. 4, the mechanical punch press 30 is activated to displace the die 38 downwardly (as illustrated in phantom) to cut a chew toy base 32 from the tire sidewall. The cut chew toy base 32 is then removed from the die 38 and the plastic punch base 42. The remaining unused tire sidewall 22 is rotated to where an unused portion of the tire sidewall is under the die 38. The press 38 is again activated, and the entire process is repeated until substantially the entire sidewall 22 is consumed in creating chew toy bases 32.

The chew toy bases 32 are then placed into a first or cleaning tumbler 44 which contains cleaning sand and gravel 46 (FIG. 6). The cleaning tumbler 44, which is similar to a concrete mixer, is rotated to tumble the cut chew toy bases 32, and the cleaning sand and gravel removes dirt and grime from the surfaces of the chew toy bases. The tumbling action also polishes the rubber.

Next, the cleaned and polished chew toy bases 32 are placed into a second or rinsing tumbler 48 which contains water (FIG. 7). As the rinsing tumbler 48 is rotated, residual sand and dirt are removed from the surfaces of the chew toy bases.

The chew toy bases 32 are removed from the rinsing tumbler 48 and placed on a drying rack 50 (FIG. 8).

Figure 10:
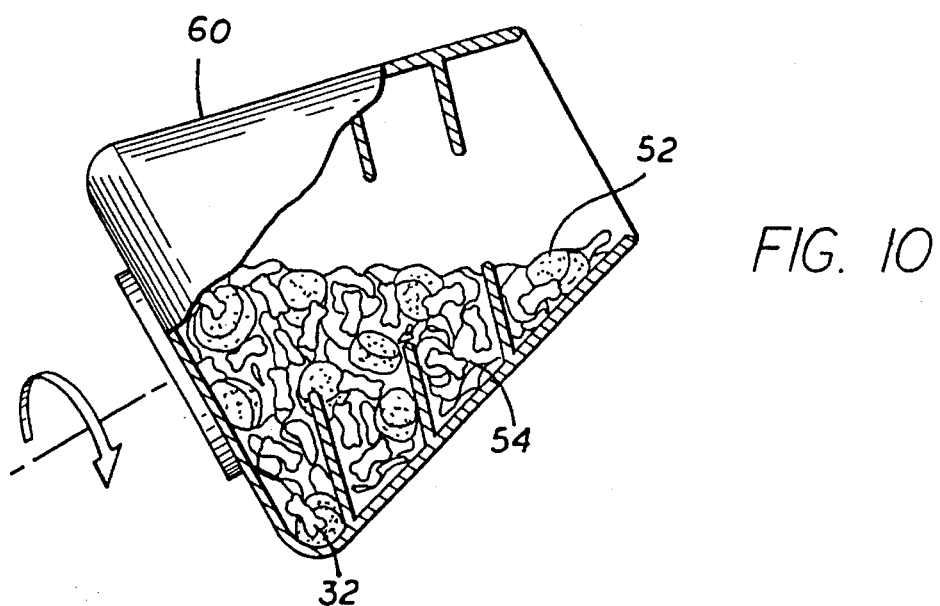
FIG. 10 is an elevational and partially sectional view of a final treatment tumbler into which the dried chew toy bases are placed with the saturated porous media for purposes of flavoring and beautifying the chew toy bases.

As shown in FIGS. 9 and 10, porous media such as sponges 52 and cloths 54 are sprayed with a flavoring agent (i.e., salt, animal fat, smoke flavor, or other flavor variations and scents) 56 and a conditioning or rubber beautifying agent (Armor All) 58 prior to being placed within a third or final treatment tumbler 60. The dried chew toy bases 32 are removed from the drying rack 50 and placed into the final treatment tumbler 60 with the porous media having the flavoring and beautifying/conditioning agents 56 and 58 applied thereto, and the final treatment tumbler 60 is rotated to bring the chew toy bases 32 into contact with the porous media 52 and 54 to effect a transfer of the flavoring agent 56 and the beautifying agent 58 to the chew toy bases 32. The porous media (sponges 52 and cloths 54) are preferably saturated with the flavoring agent 56 and the beautifying agent 58 prior to being placed within the final treatment tumbler 60.

Figure 11:
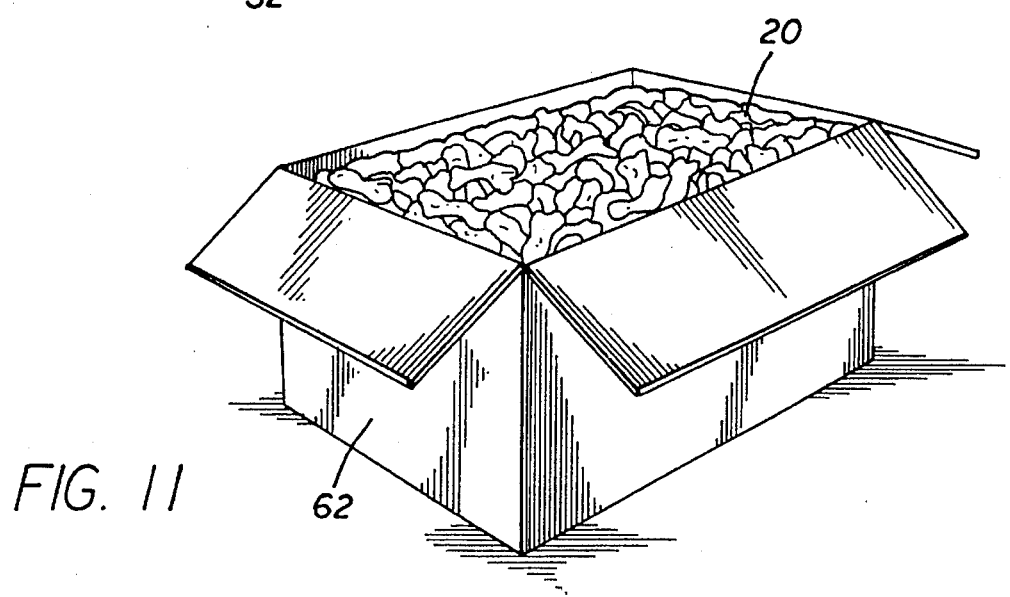
FIG. 11 illustrates the resultant dog chew toys removed from the tumbler of FIG. 10 and separated from the porous media, and then packaged in bulk packaging prior to shipment.

The beautified and flavored chew toy bases 32, when removed from the final treatment tumbler 60, are now suitable for sale as dog chew toys 20. They are then quality inspected, touched up if required, and placed in packaging 62 for shipment (FIG. 11).

From the foregoing it will be appreciated that the process set forth herein for manufacturing dog chew toys of tire sidewalls, provides a means for economically utilizing used tires to fashion a commercially useful product. The process is easy to implement and utilizes abundantly available materials and tools.

Although a particular embodiment of the invention has been described in detail for purposes of illustration, various modifications may be made without departing from the spirit and scope of the invention. Accordingly, the invention is not to be limited, except as by the appended claims.

I claim:

1. A process for manufacturing dog chew toys of tire sidewalls, comprising the steps of:
   cutting a chew toy base from a tire sidewall;
   cleaning and polishing the chew toy base within a cleaning tumbler utilizing sand and gravel;
   rinsing residual sand from the chew toy base; and
   flavoring the chew toy base with a flavoring agent within a final treatment tumbler.

2. The process of claim 1, wherein the flavoring step includes the step of placing the dog chew toy base into the final treatment tumbler with means for transferring the flavoring agent to the chew toy base.

3. The process of claim 2, including the steps of saturating a porous medium with the flavoring agent, and placing the porous medium within the final treatment tumbler to provide the means for transferring the flavoring agent to the chew toy base.

4. The process of claim 2, including the step of conditioning the chew toy base concurrently with the flavoring step.

5. The process of claim 4, wherein the conditioning step includes the steps of saturating a porous medium with a conditioning agent and placing the saturated porous medium into the final treatment tumbler to provide means for transferring the conditioning agent to the chew toy base.

6. The process of claim 1, wherein the rinsing step includes the steps of removing the chew toy base from the cleaning tumbler, and placing the chew toy base into a rinsing tumbler containing water.

7. The process of claim 6, including the steps of removing the chew toy base from the rinsing tumbler and placing it onto a drying rack prior to the flavoring step.

8. The process of claim 1, including the step of cutting the entire sidewall from the tire prior to the step of cutting the chew toy base from the tire sidewall.

9. The process of claim 8, wherein the step of cutting the sidewall from the tire includes the steps of utilizing a pivoting knife to effect the cutting while holding the tire stationary.

10. The process of claim 1, wherein the cutting step includes the step of utilizing a die to cut the chew toy base into a desired configuration.

11. The process of claim 10, wherein the cutting step includes the further steps of fitting the die to a press, placing the tire sidewall adjacent to the die, and activating the press to cut the chew toy base from the tire sidewall.

12. The process of claim 11, further including the steps of removing the chew toy base from the die, rotating the tire sidewall to place an unused portion adjacent to the die, and activating the press to cut another chew toy base, and continuing the cutting process until substantially the entire sidewall is consumed in creating chew toy bases.

13. A process for manufacturing dog chew toys of tire sidewalls, comprising the steps of:

cutting a chew toy base having a desired configuration from a tire sidewall;

placing the chew toy base into a first tumbler containing sand and gravel, and rotating the first tumbler to clean and polish the chew toy base;

placing the chew toy base into a second tumbler containing water, and rotating the second tumbler to remove residual sand and dirt;

drying the chew toy base; and placing the dried chew toy base into a third tumbler containing means for flavoring and conditioning the chew toy base, and rotating the third tumbler to flavor and beautify the chew toy base; and removing the beautified and flavored chew toy base from the third tumbler.

14. The process of claim 13, including the step of cutting the entire sidewall from the tire prior to the step of cutting the chew toy base from the tire sidewall.

15. The process of claim 14, wherein the step of cutting the sidewall from the tire includes the steps of utilizing a pivoting knife to effect the cutting while holding the tire stationary.

16. The process of claim 13, wherein the cutting step includes the step of utilizing a die to cut the chew toy base into the desired configuration.

17. The process of claim 16, wherein the cutting step includes the further steps of fitting the die to a press, placing the tire sidewall adjacent to the die, activating the press to cut the chew toy base from the tire sidewall, removing the chew toy base from the die, rotating the tire sidewall to place an unused portion adjacent to the die, and activating the press to cut another chew toy base.

18. The process of claim 13, including the steps of saturating porous media with a flavoring agent and a conditioning agent, and placing the porous media within the third tumbler to provide the means for flavoring and beautifying the chew toy base.

19. A process for manufacturing dog chew toys of tire sidewalls, comprising the steps of:

cutting a tire sidewall from a tire;

cutting a chew toy base from the sidewall utilizing a die;

placing the chew toy base into a cleaning tumbler containing sand and gravel, and rotating the cleaning tumbler to clean and polish the chew toy base;

removing the chew toy base from the cleaning tumbler and placing it into a rinsing tumbler containing water, and rotating the rinsing tumbler to remove residual sand and dirt from the chew toy base;

removing the chew toy base from the rinsing tumbler and placing it onto a drying rack;

removing the chew toy base from the drying rack and placing it into a final treatment tumbler containing porous media having flavoring and conditioning agents applied thereto, and rotating the final treatment tumbler to bring the chew toy base into contact with the porous media to effect a transfer of the flavoring agent and the conditioning agent to the chew toy base; and removing the flavored and conditioning chew toy base from the final treatment tumbler.

20. The process of claim 19, wherein the step of cutting the sidewall from the tire includes the steps of utilizing a pivoting knife to effect the cutting while holding the tire stationary.

21. The process of claim 19, wherein the cutting step includes the further steps of fitting the die to a press, placing the tire sidewall adjacent to the die, activating the press to cut the chew toy base from the tire sidewall, removing the chew toy base from the die, rotating the tire sidewall to place an unused portion adjacent to the die, and activating the press to cut another chew toy base.

* * * * *